United States Patent [19]

Heyman

[11] 4,128,867

[45] Dec. 5, 1978

[54] POWER SUPPLY REGULATION USING SWITCHING TRANSISTORS

[75] Inventor: Albert M. Heyman, Bedford, Mass.

[73] Assignee: Honeywell Information Systems Inc., Waltham, Mass.

[21] Appl. No.: 733,496

[22] Filed: Oct. 18, 1976

[51] Int. Cl.² .......................................... H02M 5/458
[52] U.S. Cl. ...................................... 363/21; 363/37; 363/143
[58] Field of Search .................. 363/16, 20, 21-26, 363/37, 60, 143, 61, 126

[56] References Cited

U.S. PATENT DOCUMENTS

| 3,851,182 | 11/1974 | Wallace | 363/60 |
| 3,924,172 | 12/1975 | Gregorich | 363/21 |

FOREIGN PATENT DOCUMENTS 2445093  4/1976  Fed. Rep. of Germany ............. 363/21

OTHER PUBLICATIONS

IBM Technical Disclosure Bulletin, vol. 17, No. 7, p. 1978, Dec. 1974.
IBM Technical Disclosure Bulletin, vol. 14, No. 3, p. 708, Aug. 1971.

Primary Examiner—William M. Shoop
Attorney, Agent, or Firm—George Grayson; Nicholas Prasinos; Ronald T. Reiling

[57] ABSTRACT

A power supply provides a low-level DC voltage to one or more DC load circuits by first rectifying either of the two standard AC voltages and thereafter reducing the rectified AC voltage to the low-level DC voltage. The reduction of the rectified AC voltage to the low-level DC voltage is accomplished by a power transformer which is switched on or off by a pair of switching transistors. The switching transistors are activated by a control transformer operating in combination with a control circuit. The control circuit timely produces various pulse conditions in the control transformer which turns the switching transistors on or off in a prescribed manner.

16 Claims, 2 Drawing Figures

POWER SUPPLY REGULATION USING SWITCHING TRANSISTORS

BACKGROUND OF THE INVENTION

1. Field of the Invention

This invention relates generally to the conversion of power from high to low voltage levels. In particular, this invention relates to the conversion of AC voltage to a relatively low level of DC voltage.

2. Description of the Prior Art

Most electronic devices operate from an AC power source of either 110 volts and 60 hertz, or 220 volts and 50 hertz. It is often the case that these electronic devices must in turn produce a constant low-level DC power. This is most often accomplished by an internal power supply which first converts the AC power to a high-level voltage which is subsequently converted to a lower level voltage.

The conversion from high-level DC voltage to low level DC voltage is often accomplished by applying the higher level DC voltage to the primary winding of a step-down transformer. The application of high-level DC voltage is moreover usually accomplished at a high frequency so as to cut down on the size and weight of the step-down transformer. Such a high frequency application to the relatively small transformer core can result in magnetic saturation unless the magnetic energy in the core is released by an opposite or cancelling flux. This is usually accomplished by closely regulating the high frequency application of the DC voltage level so as to allow for the subsequent cancellation of the magnetic flux build-up prior to saturation.

An internal power supply with the capability of applying a DC voltage to the primary winding at a relatively high frequency level while at the same time preventing magnetic saturation has been previously disclosed in the commonly assigned U.S. Pat. No. 3,924,172 to Gregorich. This particular internal power supply contains only one switching transistor employed for the purpose of selectively applying the DC voltage to the primary winding of the transformer so as to avoid magnetic saturation. This switching is often subjected to some relatively high voltage conditions immediately following a switch action. These voltage conditions are in large part attributable to the DC voltage applied to the primary winding of the transformer which is in turn a function of the standard AC power supply.

OBJECTS OF THE INVENTION

It is an object of this invention to provide a new and improved internal power supply.

It is another object of this invention to provide an internal power supply which is compatible with either of the two standard AC power sources.

It is still another object of this invention to provide a power supply which effectively converts either of the two standard AC power sources to a low-level DC voltage.

SUMMARY OF THE INVENTION

The above objects are achieved according to the present invention by providing an internal power supply which receives either of two standard AC power sources. The power supply is operative to first rectify the AC voltage and thereafter step down the resulting DC voltage level to an appropriate low-level DC voltage. The conversion from AC to DC is accomplished through a rectifier capable of receiving either of the two standard sources of AC power. The rectified voltage is thereafter applied to the primary winding of a step-down transformer under the control of a high frequency switch. Secondary windings of the transformer constitute parts of one or more circuits which filter and average the voltage induced across the secondary windings so as to obtain a constant low-level DC output voltage. The high frequency switch controls the application of the rectified DC voltage to the primary winding of the step-down transformer in accordance with the sensing of the low-level DC output voltage. Magnetic saturation of the transformer core is prevented by controlling the release of the magnetic energy stored in the core.

DESCRIPTION OF THE PREFERRED EMBODIMENT

Figure 1:
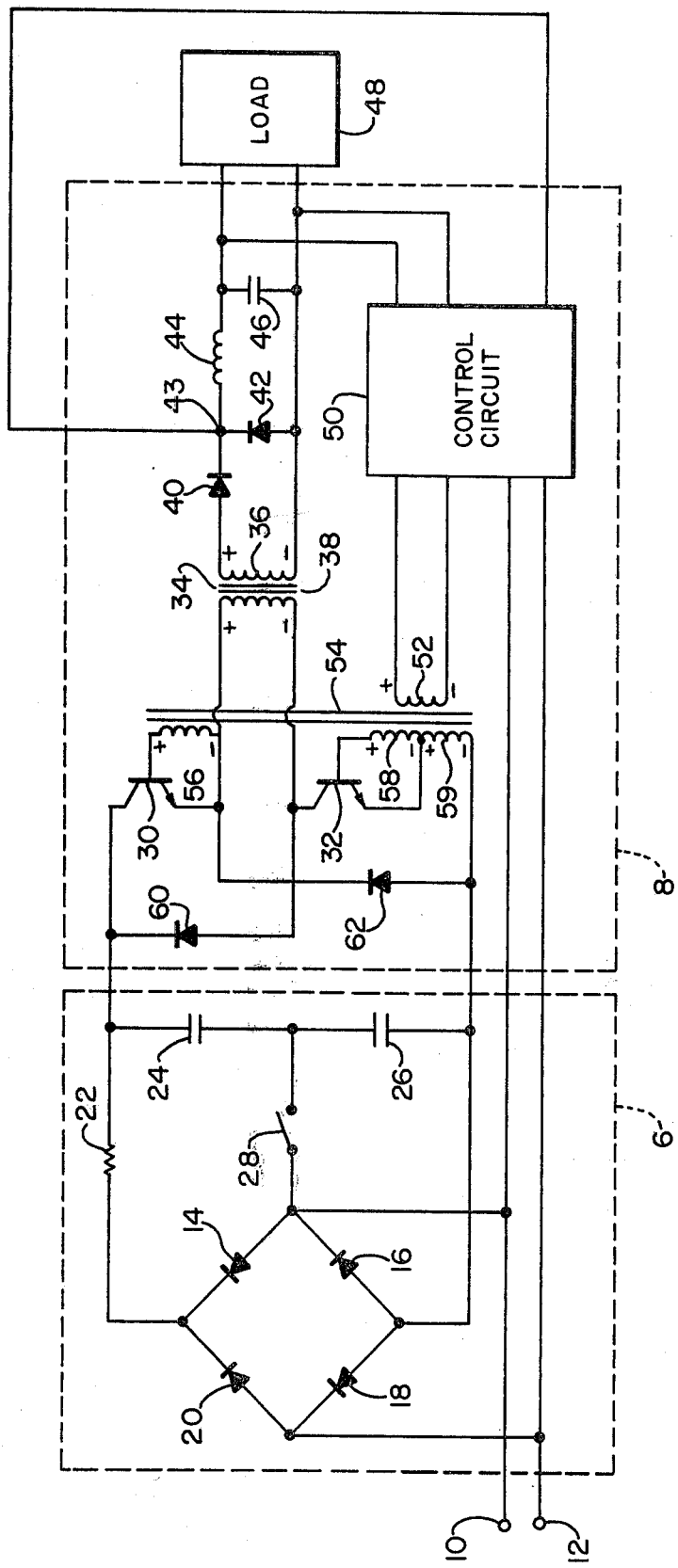
FIG. 1 illustrates the overall configuration of the power supply.

Referring to FIG. 1, a power supply is seen to consist of an AC power converter section 6 and a DC step-down portion 8. The AC power conversion section 6 receives an AC voltage via a pair of input lines 10 and 12. It is to be understood that this AC voltage will be either 110 volts, 60 hertz or 220 volts, 50 hertz. Either of these standard AC voltage conditions are applied to the input of a diode bridge comprising diodes 14, 16, 18 and 20. A resistor 22 is connected to the positive output terminal of the diode bridge. The remaining terminal of the resistor 22 is connected to a first capacitor 24 which is in turn connected to a second capacitor 26. The capacitors 24 and 26 are selectively attached across the output terminals of the diode bridge depending on the closed or open status of a switch 28.

The switch 28 is closed for a U.S. source of AC power. In this regard, assuming that the AC voltage is positive on the input line 12, the current will proceed through diode 20, resistor 22, capacitor 24, switch 28 and hence out on the neutral input line 10. Assuming a negative voltage on the input line 12, current will flow from input line 10 through the switch 28, through the capacitor 26, through the diode 18 and hence out on the input line 12. In this manner, either capacitance 24 or 26 will be separately charged depending upon the polarity of the AC voltage applied to the input lines 10 and 12. The resulting voltages across capacitors 24 and 26 combine to form a constant DC voltage equal to approximately twice the peak AC voltage on the input lines 10 and 12. This DC voltage of approximately 300 volts is subsequently applied to the voltage step-down portion 8 of the internal power supply.

The switch 28 is open for a 220-volt, 50 hertz source of AC power. In this case, when the voltage is positive on the input line 12, current flows through the diode 20, the resistor 22, the capacitors 24 and 26 and hence through the diode 16 and out on the input line 10. When the voltage on the input line 12 is negative, then the current flows from the input line 10 through the diode 14, through the resistor 22, the capacitors 24 and 26 and hence through the diode 18 so as to exit on the input line 12. In this manner, the capacitors 24 and 26 are simultaneously charged by the peak input voltage level on the input lines 10 and 12 regardless of polarity. The resulting constant DC voltage is equal to approximately 300 volts. It is to be noted that this voltage does not significantly vary from the resulting constant DC voltage occurring when the switch 28 is closed for receipt of an AC power supply of 120 volts, 60 hertz.

The voltage resulting across the capcitors 24 and 26 constitutes the DC voltage that is to be stepped down within the subsequent stage 8 of the power supply in FIG. 1. Before discussing the stepping down portion 8 of the internal power supply, it is to be noted that the diode bridge is constructed of conventional diodes whereas the resistor 22 is selected so as to limit the current being drawn by the capacitors 24 and 26 during an initial surge of charge. The capacitors 24 and 26 are to be matched so as to store the half-wave portion applied thereto when the switch 28 is in the closed position.

The step-down portion 8 of the power supply begins with a pair of transistors 30 and 32 which are connected in series with a primary winding 34. As will become apparent hereinafter, the transistors 30 and 32 are operative to essentially apply the DC voltage across the capacitors 24 and 26 to the primary winding 34 depending on whether or not the transistors are in an on or an off condition. Assuming that the transistors 30 and 32 are in an on condition, the voltage across the capacitors 24 and 26 will be essentially impressed across the primary winding 34. In this regard, very little voltage is lost across the transistors 30 and 32 when they are in a conductive state. According to normal transformer action, the voltage impressed across the primary winding 34 results in a proportional voltage across a secondary winding 36. This step-down voltage transfer is accomplished between the primary winding 34 and the secondary winding 36 in association with a gapped core 38. It is to be understood that there may be many secondary windings 36 associated with the gapped core 38. Attached across the secondary winding 36 is a pair of diodes 40 and 42. Both of the diodes 40 and 42 are forward-biased in the direction away from the secondary winding 36 so as to rectify the voltage induced across the secondary winding 36. The resulting rectified DC voltage appears at a terminal 43. This rectified DC voltage is next averaged and filtered by an inductor 44 and a capacitor 46. A low-level DC voltage results across the output capacitor 46. This voltage is applied to a load 48 as well as a control circuit 50.

The control circuit 50 also receives the standard AC voltage via the input lines 10 and 12 as well as the rectified DC voltage from the terminal 43. The control circuit 50 is operative to generate a pulse when the output voltage applied to the load 48 falls below a certain reference voltage level. The particular reference voltage level is set at the average desired output voltage for the load 48. The pulse from the control circuit 50 is applied to a primary winding 52 which produces a magnetic field in a gapped core 54 that induces a current in secondary windings 56 and 58 respectively. This results in a surge of base current through the transistors 30 and 32. This surge of current turns the transistors 30 and 32 on so as to allow current to flow from the collector of transistor 30 through to the emitter thereof and subsequently through the primary coil 34 and hence through the collector and emitter of the transistor 32. Current also begins to flow through a winding 59 which, due to transformer action, induces a current through the windings 56 and 58 so as to reinforce the initially-impressed voltage due to the control pulse from the control circuit 50. In this manner, a base current is continually maintained through the transistors 30 and 32 thereby keeping them in a conductive state. This state continues until acted upon further by the control circuit 50.

When the control circuit 50 determines that it is time to terminate the application of the DC voltage to the primary winding 34, it produces a second pulse across the winding 52. This in turn induces negative voltages across the secondary windings 56 and 58 which turn the transistors 30 and 32 off. The transistors 30 and 32 remain in an off position thereby allowing the magnetic energy stored in the gapped core 38 to dissipate. The control circuit 50 maintains the transistors 30 and 32 in an off-condition for a period of time at least equal to their on-time. In this manner, the gapped core 38 is allowed at least the same number of volt seconds in the off condition as it experiences in an on condition. It is furthermore to be noted that the number of volt-seconds of on-time is such as to not permit the magnetic saturation of the gapped core 38.

Figure 2:
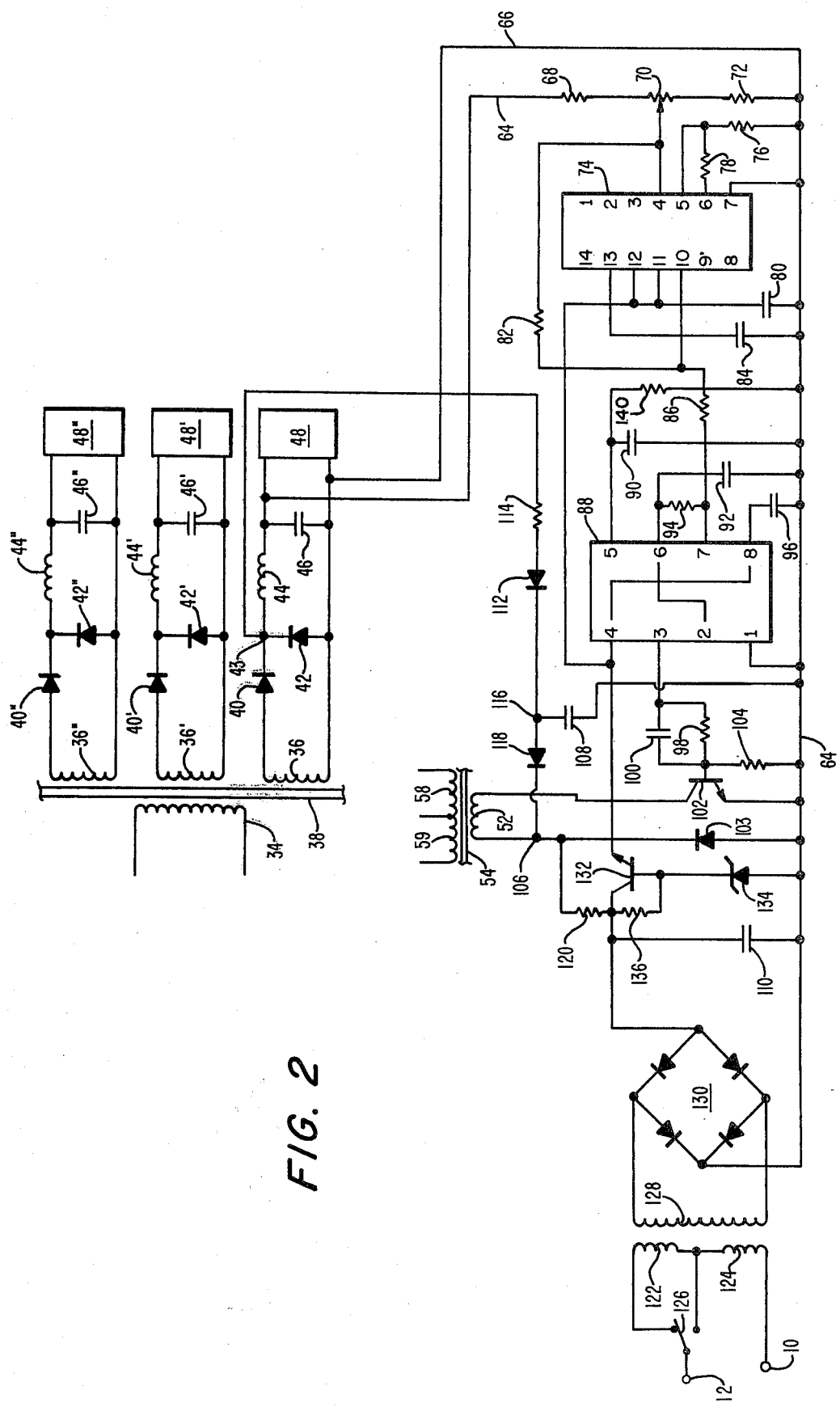
FIG. 2 illustrates the control pulse circuitry for the power supply of FIG. 1.

Referring now to FIG. 2, the control circuit 50 is illustrated in further detail together with its various connections to certain elements of FIG. 1. It is to be noted that certain additional elements not previously set forth in FIG. 1 and not part of the control circuit 50 are also shown in FIG. 2. In this regard, a pair of additional secondary windings 36' and 36" and associated load circuits appear along with the original winding 36 and its associated load circuitry. The primed and double-primed circuitry indicates similar elements.

The control circuit 50 is connected across the load 48 via a pair of lines 64 and 66. The line 64 is connected to the positive-most side of the voltage applied to the load 48 whereas the line 66 is connected to the negative side thereof. The line 66 is used as a ground line within the control circuit 50 and will sometimes be referred to as such hereinafter. Across the lines 64 and 66 is attached, in series, a resistor 68, a potentiometer 70, and another resistor 72. The slider of the potentiometer 70 is attached to a pin 4 of an error amplifier 74. The error amplifier 74 is a standard integrated circuit, AMU 723. Details of this integrated circuit can be found in the "Linear Integrated Circuit Data Book", 1976, by Fairchild Semiconductor Co., Mountainview, Calif. Connected to pin 5 of the error amplifier 74 and to the ground line 66 is a resistor 76. A resistor 78 is attached from pin 5 to pin 6 of the error amplifier 74. A pin 7 of the error amplifier 74 is attached to the ground line 66.

The error amplifier 74 senses the voltage at the pin 4 and compares the same with the voltage present at pin 5. This latter voltage is defined by the amplifier voltage at pin 5 which has been divided by the resistors 76 and 78. This particular voltage at pin 5 is established as the reference voltage from which any variance in the voltage across load 48 is to be measured. The error amplifier 74 compares the voltages at pins 4 and 5 and amplifies any difference therebetween for subsequent output at pin 10.

Pins 11 and 12 of the error amplifier 74 are attached to one terminal of a capacitor 80. The other terminal of the capacitor 80 is attached to the ground line 66. The capacitor 80 acts as a noise filter. A feedback resistor 82 is attached from pin 10 to pin 4 of the error amplifier 74. A capacitor 84, for frequency compensation, is attached from pin 13 of the error amplifier 74 to the ground line 66.

A resistor 86 is attached to the output pin 10 of the error amplifier 74 and to an input pin 7 of a timer 88.

The timer 88 is a standard integrated circuit NEE 555. Such a circuit can be found in the "Digital Linear MOS Data Book", 1974, by Signetics Corp., Menlo Park, Calif. A capacitor 90 and a resistor 91 are connected between pin 5 of the timer 88 and the ground line 66. A capacitor 92 is connected between a pin 6 of the timer 88 and the ground line 66. A resistor 94 is connected across the pins 6 and 7 of the timer 88. Across pin 8 of the timer 88 and the ground line 66 is attached a capacitor 96.

Also on the timer 88, a pin 2 is connected to a pin 6, and a pin 4 is connected to a pin 8. Pin 1 is attached to the ground line 66 and pin 4 is attached to pin 12 of the error amplifier 74. A resistor 98 and a capacitor 100 are connected in parallel between the pin 3 of the timer 88 and the base of a transistor 102. The base of the transistor is biased with respect to the ground line 66 by a resistor 104. The collector of the transistor 102 is connected to the positive end of the winding 52 whereas the emitter is connected to the ground line 66. The negative terminal of the winding 52 is clamped and prevented from going below ground by diode 103.

The operation of the timer 88 relative to the error amplifier 74 is as follows. Current from the output pin 10 of the error amplifier 74 flows through resistors 86 and 94 and subsequently charges the capacitor 92. The voltage at pin 6 which is upstream of the capacitor 92 also rises with the charging of the capacitor 92. When the resulting voltage on pin 6 is equal to the voltage on pin 5, the timer 88 changes state causing pin 3 to drop to a low voltage and pin 7 to drop to ground. The voltage drop at pin 3 causes the transistor 102 to turn off. The voltage drop at pin 7 causes the capacitor 92 to begin to discharge through resistor 94 to the pin 7. The capacitor 92 continues to discharge until such time as its upstream voltage at pin 6 decays to one-half the voltage at pin 5. At this time, the timer 88 again changes state causing pin 3 to switch logically high and pin 7 to switch open. The logically high condition of pin 3 turns transistor 102 on. With the transistor 102 turned on, current again flows through the winding 52.

It is to be noted that the on-time of the transistor 102 is governed by the charge time of the capacitor 92 and the resistors 86 and 94. The charge time of the capacitor 92 is also governed by the variable voltage of pin 10 of the error amplifier 74 and its associated components. The charge time will vary in accordance with the variable voltage applied thereto, but will always be greater than the decay time of the capacitor 92. This is due to the minimum charge time being a function of the RC time constant as defined by resistors 86 and 94 in series combination with the capacitor 92.

It is furthermore to be noted that the off-time of transistor 102 is governed by the decay time of the capacitor 92. The decay time is fixed by the RC time constant of the capacitor 92 and the resistor 94. Since the RC time constant does not change, the off-time of the transistor 102 will remain constant.

The current flow through the winding 52 is governed by the voltage at a point 106 which will be more fully described hereinafter. At this time, it is merely to be noted that the voltage at point 106 will cause current to flow through the winding 52 and hence through the collector and emitter of the transistor 102 to the ground line 66 when the transistor 102 has been turned on. Current will cease to flow through the winding 52 when the transistor 102 is turned off.

It will be remembered from the description of FIG. 1 that the winding 52 constitutes one winding of a transformer having a core 54 with other windings 56, 58 and 59. It will moreover be remembered that the windings 56 and 58 are parts of the base drive circuits for the transistors 30 and 32. These transistors are initially turned on by a surge in their respective base currents caused by an induced current flow in the windings 56 and 58. This induced current flow in the windings 56 and 58 is attributed to the establishment of a pulse condition in the winding 52 by the control circuit 50. The actual pulse condition which is established is one of a current collapse in the winding 52. This is caused internally within the control circuit 50 by the turning off of the transistor 102.

It will be remembered that the current condition in the winding 52 is subsequently changed again by the control circuit 50 producing a second pulse so as to cause the transistors 30 and 32 to be switched off. This second pulse is synonymous with the transistor 102 being turned on within the control circuit 50 so as to thereby cause significant current to flow through the winding 52 from the point 106.

To summarize the above, the transistors 30 and 32 will be off when the transistor 102 is on and vice versa. The conductive condition of the transistor 102 is in turn dependent on the output of the timer 88 at its pin 3. The transistor 102 will be turned on for a logically high voltage at pin 3 of the timer 88 and will be turned off for a low voltage at pin 3. The voltage level of pin 3 is in turn dependent on the charge and decay times of the capacitor 92. In this regard, the capacitor 92 is first charged in response to an error signal from pin 10 of the error amplifier 74. During this time, the output of the timer 88 is logically high. The output of the timer 88 subsequently goes logically low when the voltage at a pin 6 of the timer 88 which is upstream of the capacitor reaches a predefined voltage. According to the operation of the timer 88, this voltage is set at pin 5 of the timer 88. The capacitor 92 subsequently discharges through a pin 7 of the timer 88 until the voltage upstream thereof (at pin 6) equals one-half the voltage at pin 5 of the timer 88. At this time, the timer 88 again changes state causing the output thereof at pin 3 to go logically high. This logically high condition again turns on transistor 102. In this manner, it is to be appreciated that the decay time of the capacitor 92 governs the off-time of the transistor 102 and hence the on-time of the transistors 30 and 32. Hence the decay time of the capacitor 92 governs the amount of time in which the DC voltage is applied across the primary winding 34. The application of the DC voltage is followed by an off-time of the transistors 30 and 32. It is to be noted that the capacitor 92 will again charge to a level necessitating a drop in the output voltage of the timer 88 when an error output is still present on the pin 10 of the error amplifier 74. This will again turn off the transistor 102 and turn on the transistors 30 and 32. This on-off switching of transistors 30 and 32 will continue to occur at such time as the error output from the error amplifier 74 falls short of the predefined voltage at pin 5 of the timer 88.

It will be remembered that the current condition of the winding 52 was in part dependent upon the voltage at a point 106. The voltage at the point 106 is dependent upon the voltage levels of two capacitors, namely, 108 and 110. Beginning first with the capacitor 108, it is to be noted that the same is connected through a diode 112 and a resistor 114 to the point 43. The other side of the capacitor 108 is connected to the ground line 66. The point 43 will be at a sufficiently high voltage relative to the ground line 66 during the on-time of transistors 30 and 32 so as to charge the capacitor 108. In this regard, the charge rate will be dependent upon the value of the resistance 114. It is therefore to be appreciated that an appreciable voltage will be established at a point 116 upstream of the capacitance 108. This point is connected to the point 106 through a diode 118 which assures that only a positive current contribution will be made to the point 106.

The secondary source of voltage for the point 106 is that of the capacitance 110. The capacitance 110 is seen to be connected through a resistance 120 to the point 106. This particular current path through the resistance 120 provides for a limited current flow attributed to the DC voltage established across the capacitance 110. As will become apparent hereinafter, this particular contribution from the capacitance 110 is secondary to its primary function.

The primary function of the capacitor 110 is to provide DC voltage to the essential operating components of the control circuit 50. This DC voltage is developed across the capacitor 110 by virtue of an upstream power conversion from an AC voltage appearing on the input lines 10 and 12. In this regard, the standard AC voltage is first applied across either a winding 122 or the winding 122 in series with a winding 124. The series connection of the windings is dependent on the open or closed status of a switch 126. The switch 126 is in the depicted position of FIG. 2 for an AC voltage of 220 volts and 50 hertz. The windings 122 and 124 are seen to be connected in series for application of this AC voltage. The switch 126 is in the opposite position so as to form a series connection with only winding 124 when the standard AC power of 120 volts and 60 hertz is used. The turns ratio between the windings 122 and 124 with respect to the secondary winding 128 allows for an appropriate stepped-down voltage to be rectified by the full-wave bridge rectifier 130. The resulting voltage output from the bridge rectifier 130 is applied to the capacitor 110. The DC voltage which is thereby established across the capacitor 110 establishes the collector voltage for a transistor 132. A zener diode 134 is attached between the base of the transistor 132 and the output ground line 66. A resistor 136 is attached across the base and the collector of the transistor 132. The emitter of the transistor 132 is attached to pin 4 of the timer 88 as well as pins 11 and 12 of the error amplifier 74. The transistor 132 acts as a regulator for controlling the application of the DC voltage across the capacitor 110 to the timer 88 as well as the error amplifier 74.

The key factor in the operation of the high voltage switching transistors 30 and 32 lies in the base drive circuit waveforms. Transformer windings 56, 58 and 59 constitute a current transformer which controls the on and off state of transistors 30 and 32. Windings 56, 58 and 59 are driven by transistor 102 as will now be described. During the on interval of transistor 102 which is the off interval of switching transistors 30 and 32, current limited by resistor 120 and the residue energy stored in the winding 52 keep the core 54 in saturation. Transistors 30 and 32 are turned on at the appropriate time by shutting off transistor 102. The energy stored in the leakage inductance winding 52 is transferred to windings 56 and 58 causing base current to flow latching transistors 30 and 32 on. The emitter current of transistors 30 and 32 is sensed by winding 59. The secondary windings 56 and 58 drive the bases of 30 and 32 with a current equal to one-half the turns ratio of winding 59 to winding 58 times the emitter current of transistor 32. The regenerative feedback from the linear current transformer keeps transistors 30 and 32 latched on.

During the time that transistor 102 is off, switching transistors 30 and 32 are on and current from winding 36 flows through diode 40, resistor 114 and diode 112 and charges capacitor 108 up to approximately a predefined voltage level. At the end of the power pulse, transistor 102 is turned on. Bias current from resistor 120 and energy from capacitor 108 coupled by diode 118 overrides the forced gain drive and provides an active reverse bias on transistors 30 and 32 for the entire off interval when transistor 102 is turned on. The reverse bias pulls stored charge out of the base of transistors 30 and 32 minimizing power dissipation during off. The "fast turn off circuit" is composed of diodes 118, 112, resistor 114, and capacitor 108 provides the secondary source of energy to shut off the switching transistors. The on time of the switching transistors, fixed by the timer components capacitor 92 and resistors 94 and 140, is always much less than the off time and this allows the gapped core 38 to magnetically reset such that there is no residual magnetic field build-up.

Typical values for the components of FIGS. 1 and 2 are as follows:

| TABLE OF TYPICAL VALUE OF COMPONENTS | |
|---|---|
| Capacitor | Microfarads |
| 24 | 2000 |
| 26 | 2000 |
| 46 | 65000 |
| 80 | 1 |
| 84 | 100 picofarads |
| 90 | .01 |
| 92 | .01 |
| 96 | 1.8 |
| 100 | .015 |
| 110 | 200 |
| 108 | .22 |
| Rectifier | No. |
| 40 | IN 3909 |
| 42 | IN 3909 |
| 60 | IN 4936 |
| 62 | IN 4936 |
| 104 | IN 4933 |
| 118 | IN 4933 |
| 112 | IN 4933 |
| 103 | IN 4933 |
| Resistor | Ohms |
| 22 | .25 |
| 68 | 1.6K |
| 72 | 1.8K |
| 76 | 2.7K |
| 78 | 4.7K |
| 82 | 500K |
| 86 | 1.8K |
| 94 | 1.5K |
| 98 | 240 |
| 104 | 2K |
| 136 | 620 |
| 120 | 1000 |
| 111 | 15 |
| 140 | 9.1K |
| Inductor | Microhenery |
| 44 | 35 |
| Transistor | No. |
| 30 | 2N 6308 |
| 32 | 2N 6308 |
| 102 | D 44C7 |
| 132 | D 44C7 |
| Zener Diodes | No. |
| 134 | IN 827A |
| 142 | IN 755 |

From the foregoing, it is to be appreciated that a preferred embodiment has been disclosed of a power supply capable of providing a low-level DC voltage to one or more load circuits. The circuitry disclosed in this preferred embodiment is comprised of various elements which may have equivalents thereto and may be used without departing from the scope of the present invention.

What is claimed is:

1. A power supply system for converting standard AC voltage to a low-level DC voltage, said system comprising:

means for converting the standard AC voltage to a first DC voltage level;

means for maintaining said first DC voltage level;

means for transforming the first DC voltage level to the low-level DC voltage said transforming means including a primary winding and at least one secondary winding;

means for applying the first DC voltage level to said means for transforming the first DC voltage level to the low-level DC voltage, said application means comprising:

a first switching means connected to a first terminal of the primary winding of said transforming means, a second switching means connected to a second terminal of the primary winding of said transforming means, and means for controlling the switching action of said first and second switching means wherein said means comprises:

a control transformer with primary and secondary windings; and a control means for producing pulse conditions in the primary winding of said control transformer, wherein a pair of secondary windings of said control transformer are each connected to switching terminals within said first and second switching means, wherein a third secondary winding of said control transformer is connected to commonly polarized terminals of said pair of secondary windings of said control transformer and provides a current source to maintain said first and second switching means in conduction, said control means for producing pulse conditions comprising circuit means for providing a fast turnoff for said first and second switching means, said circuit means being coupled to the positive terminal of said control transformer primary winding and a first terminal and a second terminal of at least one secondary winding of said transformer means.

2. The system of claim 1 wherein the switching terminals of said first and second switching means are each connected to commonly polarized terminals of said pair of secondary windings of said control transformer.

3. The system of claim 2 wherein said first and second switching means each comprise a transistor and wherein said switching terminals within said first and second switching means each comprises an input terminal for the base of said transistor.

4. The system of claim 2 further comprising at least one electrical load connected across a secondary winding of said means for transforming the first DC voltage level to the low-level DC voltage wherein said control means is responsive to a drop in the low-level DC voltage applied to said electrical load.

5. The system of claim 4 wherein said control means for producing pulse conditions comprises:

means for detecting a relative voltage drop between said low-level DC voltage applied to said load and a reference voltage; and timing means, responsive to said detecting means indicating the detection of the relative voltage drop, for producing a bi-level signal having a first signal level occurring first for a predetermined period of time and a second signal level occurring for a second period of time wherein the second period of time is greater than the first period of time.

6. The system of claim 5 wherein said control means for providing pulse conditions further comprises:

a control transistor conductively connected to the negative terminal of the primary winding of said control transformer, said control transformer being non-conductive in response to the first signal level of the bi-level signal produced by said timing means and said control transistor being conductive in response to the second signal level of the bi-level signal produced by said timing means.

7. The system of claim 6 wherein the non-conductive condition of said control transistor produces a pulse condition in the primary winding of said control transformer which is operative to turn on said first and second switching means for the first predetermined period of time and wherein the conductive condition of said control transistor provides a discharge path for said circuit means through the primary winding of said control transformer to provide a fast turnoff of said first and second switching means;

said circuit means comprising:

resistor means in series with a first unidirectional circuit means coupled between said first terminal of said secondary winding of said transformer means and a junction of a first terminal of a capacitor means and a second unidirectional circuit means to charge said capacitor means to a predetermined voltage level when said first and second switching means are conducting, said capacitor means having a second terminal coupled to said second terminal of said transformer means; and said second unidirectional circuit means coupled between said junction and the positive terminal of said control transformer primary winding of said control transformer, said conductive condition of said control transformer, to said second terminal of said secondary winding of said transformer means to pull stored charge out of the base of said first and second switching means to provide said fast turnoff of said first and second switching means.

8. The system of claim 7 wherein said control means further comprises:

means, connected to a point between said secondary winding of said transforming means and said load, for establishing a voltage level upstream of the primary winding of said control transformer.

9. The system of claim 1 further comprising at least one electrical load connected across a secondary winding of said means for transforming the first DC voltage level to the low-level DC voltage wherein said control means is responsive to a drop in the low-level DC voltage applied to said electrical load.

10. The system of claim 9 wherein said control means for producing pulse conditions comprises:

means for detecting a relative voltage drop between said low-level DC voltage applied to said load and a reference voltage; and timing means, responsive to said detecting means indicating the detection of the relative voltage drop, for producing a bi-level signal having a first signal level occurring first for a predetermined period of time and a second signal level occurring for a second period of time wherein the second period of time is greater than the first period of time.

11. The system of claim 10 wherein said control means for producing pulse conditions further comprises:

a control transistor conductively connected to the negative terminal of the primary winding of said control transformer, said control transistor being non-conductive in response to the first signal level of the bi-level signal produced by said timing means.

12. The system of claim 11 wherein the non-conductive condition of said control transistor produces a pulse condition in the primary winding of said control transformer which is operative to turn on said first and second switching means for the first predetermined period of time.

13. The system of claim 12 wherein said control means further comprises:

means, connected to a point between said secondary winding of said transforming means and said load, for establishing a voltage level upstream of the primary winding of said control transformer.

14. The system of claim 1 wherein said first and second switching means each comprise:

a switching transistor having a base connected to a terminal of one of said secondary windings of said control transformer.

15. The system of claim 14 wherein the terminal of each secondary winding of said control transformer that is connected to the bases of said switching transistors is identically polarized.

16. The system of claim 15 wherein the secondary windings of said control transformer having identically polarized terminals connected to said switching transistors further comprise a second pair of identically polarized terminals which are connected to a third secondary winding of said control transformer.

* * * * *